April 29, 1924.
C. H. HAPGOOD
1,492,168
PROCESS OF REFINING SUGAR CANE JUICE
Filed Sept. 8, 1921
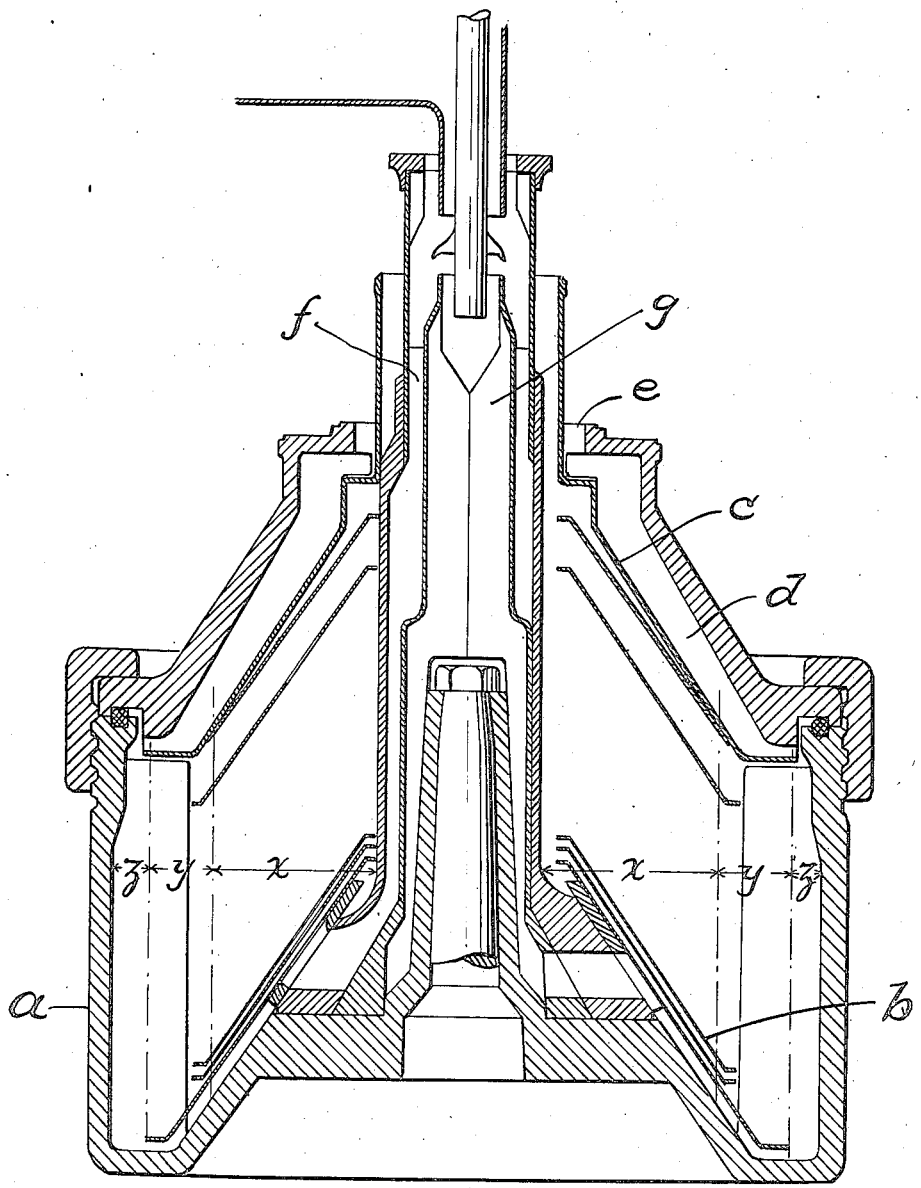
WITNESS:
INVENTOR
Cyrus Howard Hapgood
BY
Frank S. Busser
ATTORNEY.

Patented Apr. 29, 1924.

1,492,168

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

PROCESS OF REFINING SUGAR-CANE JUICE.

Application filed September 8, 1921. Serial No. 499,292.

*To all whom it may concern:*

Be it known that I, CYRUS HOWARD HAPGOOD, a citizen of the United States, residing at Nutley, county of Essex, and State of New Jersey, have invented a new and useful Improvement in Processes of Refining Sugar-Cane Juice, of which the following is a full, clear, and exact description, reference being had to the accompanying drawings, which form a part of this specification.

Raw sugar cane juice contains fibrous organic material which is bacteria-forming and which rapidly acidifies the juice. When raw sugar cane juice is allowed to stand for any substantial length of time it becomes rancid and spoilt. Hence it is necessary to evaporate the juice before acidification sets in. The impurities, however, remain in the raw sugars and their elimination adds materially to the expense of refining.

The object of my invention is to eliminate the specified impurities, as well as any dirt or other contaminating matter, from sugar cane juice in order, first, that it may be kept for a substantial time without deterioration where conditions are such as to make it inconvenient to immediately evaporate it; second, that the raw sugar itself will be purified so that when sold as such, it will be superior in purity to commercial brown sugar; third, that the refining process may be simplified by the omission of such part of the treatment as is now required to eliminate the impurities that are present in normal refined sugar; and fourth, to accomplish these results with the greatest possible economy.

The practice of my process involves two known principles, namely: centrifugal force and the sludging out of the solid impurities (which are of higher specific gravity than the juice) by means of an added liquid of greater specific gravity than the liquid to be purified, which added liquid may or may not be of greater specific gravity than the impurities.

The application of these principles would seem to involve the selection of a heavy sludging liquid which is not miscible with the sugar cane juice and that would not impart to the cane juice any disagreeable properties, such as impairment of flavor.

In an application for patent filed by me May 7, 1912, Serial No. 467,529, I have set forth a compound liquid which has these qualities and is capable of successful use, namely: paraffine oil, five parts, and carbon tetrachloride, two parts. Paraffine oil is a liquid which is not miscible with sugar cane juice and which will not impart to the juice any foreign property, but its specific gravity (about .9) is below that of the juice (about 1.02). Carbon tetrachloride possesses the requisite high specific gravity (about 1.64) and is not miscible with the juice, but it imparts a disagreeable flavor to the juice. Further, these two liquids, while neither is miscible with sugar cane juice, are miscible with each other. Again, these two liquids may be mixed in proportions to give any desired specific gravity to the solution. Finally, the solution of carbon tetrachloride and paraffine imparts no disagreeable flavor to the sugar cane juice.

In carrying out said process, a special type of centrifuge should be used. One such type is a centrifuge constructed in accordance with the Snyder Patent No. 1,283,343, dated October 29, 1918. Preferably, however, there should be used a centrifuge constructed in accordance with the Hall Patent 1,422,852, July 18, 1922, wherein the heavier compound liquid is conveyed separately and directly to the periphery of the bowl, thereby avoiding admixture of the higher specific gravity sludging liquid with the cane juice.

This process is entirely operative and satisfactory. The heavy compound liquid is, however, somewhat expensive, and while the same liquid may be used repeatedly, there are inevitable losses and the liquid gradually decreases in purity. These objections do not militate against the commercial practicability of the process, much less against its operativeness; but a substantial cheapening of the process is desirable. My present invention accomplishes this object in that it necessitates the use of a comparatively negligible quantity of the liquid.

In carrying out my process, I continue to utilize the same compound liquid to form, in the centrifugal bowl, an enveloping liquid zone around the sugar cane juice and into which the impurities in the juice are projected by centrifugal force. I do not, however, use the compound liquid as an agent for the removal of such impurities from the bowl, but utilize a still heavier and much cheaper liquid, such as brine, to form a cushion enveloping the compound liquid and which is continuously supplied to and continuously removed from the bowl, the compound liquid of intermediate gravity being held in the bowl and acting as a stationary permeable partition through which the impurities travel into the outer traveling cushion, by which such impurities are carried out of the bowl.

It is quite true that the employment of a partitioning liquid between the cane juice and the outside sludging liquid would be without utility in case the latter liquid were immiscible with the cane juice as well as sufficiently cheap to effect the economy at which I aim; but no such liquid is available. Brine, for example, is miscible with the cane juice, but it is not miscible with a solution of paraffine and carbon tetrachloride, and the latter not being miscible with the cane juice, the utility of the process is precisely the same as if the brine itself were immiscible with the cane juice.

It is clear, however, that the invention is not limited to the employment of the two liquids specified, namely: brine and a solution of paraffine and carbon tetrachloride. Any outside cushioning and sludging liquid of adequate specific gravity that is not miscible with the partitioning liquid may be used. Any partitioning liquid of proper intermediate specific gravity which is not miscible with either the outer liquid or the cane juice may be used. The particular liquids mentioned, however, have the following advantages.

The intermediate liquid will not impart to the cane juice any disagreeable properties, such as impairment of flavor. Inasmuch as it is a compound liquid whose constituents are of widely different specific gravities, by a variation of the proportions of its constituents it may be made to have any specific gravity desired within operative limits. It is necessary that the specific gravity shall be greater than that of the cane juice, and it is also necessary that its specific gravity shall be less than that of the impurities, or most of them, that the cane juice contains, in order that the impurities may not only pass into, but also pass through, the same into or against the outside traveling cushion.

Brine is about the cheapest liquid having a specific gravity greater than that of water and its specific gravity also may be fixed to a nicety by regulating the degree of its concentration.

No technical difficulties of a mechanical character present themselves. It is only necessary to first run into the bowl a predetermined quantity of brine and compound liquid and then to continuously admit brine and sugar cane juice, the rate of admission and discharge of the brine being so proportioned to the capacity of the heavy discharge outlet from the separating compartment that said outlet will at all times be sealed by the brine so as to substantially exclude the escape of the compound liquid. It is, of course, necessary to feed the brine and the sugar cane juice into the separating compartment of the bowl through separate supply channels and to deliver the brine into such compartment outside the zone of partitioning liquid and to deliver the cane juice into such compartment inside said zone. This method of feed is rendered possible by the employment of a bowl of the Hall type hereinbefore mentioned. The initial admission of the compound liquid should be through the brine inlet.

To clarify an understanding of the process, I have illustrated a centrifugal machine of the Hall type in the accompanying drawing, which is a vertical sectional view through the bowl.

$a$ is the bowl body; $b$ a multiple disc liner thereon; $c$ the top disc around the periphery of which the heaviest liquid is discharged into the channel $d$ leading to the outlet $e$; $f$ a feed tube through which the cane juice is admitted to the interior of the separating compartment at a distance from the bowl periphery, the juice flowing up through aligning orifices in the liner and distributing itself through the separating space in the course of its upward flow; $g$ a feed tube within the feed tube $f$ and communicating, through passages beneath the liner, with the peripheral part of the bowl.

In operation, the liquids arrange themselves into an inner zone $x$ of cane juice, an intermediate permeable partition $y$ of the solution of paraffine and carbon tetrachloride, and an outer zone $z$ of brine sealing the exit around the edge of the top disc.

It is clear, from what I have said, that the process is not limited to the use of the particular illustrative and preferable liquids specified. Any liquid, simple or compound, including any oil of mineral, vegetable or animal origin that is not miscible with cane juice, that will not impart thereto any disagreeable or objectionable property, and which is of the proper specific gravity, may be substituted for the solution of paraffine and carbon tetrachloride. Any liquid of sufficiently high specific gravity and which is not miscible with the partitioning liquid, may be substituted for brine.

It is clear, also, that the invention, while novel as applied to the purification of sugar cane juice, is also, in its broader aspect, adaptable to the purification of liquids other than sugar cane juice; that is, to that class of liquids containing solid or semi-solid impurities which heretofore could not be centrifugally purified because, with known centrifugal processes, no liquid for sludging purposes was available which had the qualities of proper specific gravity, immiscibility with the liquid to be purified, and economy.

In referring to the liquid partition of intermediate specific gravity as a stationary partition, I do not mean that the particles thereof shall not have a substantial movement among themselves or that the partition as a whole shall have no movement of rotation within the bowl, but that there shall be no substantial travel of the partitioning liquid into and from the bowl.

It is obvious that the beneficial results of my invention may be accomplished in less degree if the partitioning liquid is introduced into the bowl, and discharged therefrom with the brine, in such small proportions as to reduce its loss to a minimum. In such case, the inflow and outflow of the partitioning liquid would be so insubstantial as not to be without the scope of my invention.

Having now fully described my invention, what I claim and desire to protect by Letters Patent is:

1. The process of purifying sugar cane juice by removal therefrom of ingredients whose retention promotes deterioration which comprises subjecting the same, a solution of carbon tetrachloride and paraffine oil having a specific gravity greater than that of the cane juice, and brine having a specific gravity greater than that of said solution, to centrifugal force, separately flowing the brine and cane juice to the locus of centrifugal force and separately flowing the same away from said locus, and substantially restraining said solution from escape from said locus so that the same forms a permeable partition between the inner zone of cane juice and the outer zone of brine and through which the impurities pass and discharge within the brine.

2. The process of purifying sugar cane juice by removal therefrom of ingredients whose retention promotes deterioration which comprises subjecting the cane juice and a liquid of greater density miscible therewith to centrifugal force while separately flowing the juice and relatively dense liquid to and from the locus of centrifugal force, and establishing between the zones occupied by said substances during centrifugation a permeable partition formed of a liquid immiscible with either of such substances and of a specific gravity between the specific gravities of said substances.

3. The process of purifying a liquid by the removal therefrom of contaminating ingredients mixed or emulsified therewith which comprises subjecting said liquid and a liquid of greater density miscible therewith to centrifugal force while separately flowing the said liquids to and from the locus of centrifugal force, and establishing between the zones occupied by said liquids during centrifugation a permeable partition formed of a liquid which is denser than the first liquid, less dense than the second liquid and miscible with neither.

4. The process of purifying a liquid by the removal therefrom of contaminating ingredients which comprises subjecting said liquid and a liquid of greater density miscible therewith to centrifugal force while separately flowing the said liquids to and from the locus of centrifugal force, establishing between the zones occupied by said liquids during centrifugation a permeable liquid partition, and restraining the partitioning liquid from escape with either of the other liquids, said partitioning liquid being immiscible with either of the other liquids, denser than the liquid to be purified and less dense than the contaminating ingredients therein and than the other liquid.

In testimony of which invention, I have hereunto set my hand, at New York, on this 2nd day of September, 1921.

CYRUS HOWARD HAPGOOD.

Witnesses:
R. R. WARREN,
G. D. TALLMAN.